Figure 1:
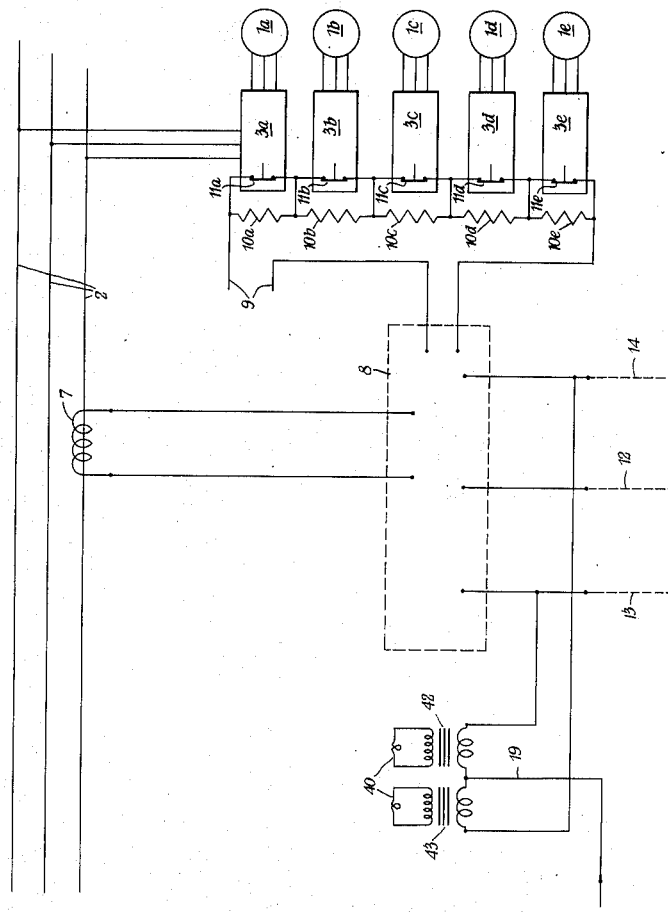

Sept. 7, 1965   G. E. COBB   3,205,420
PLURAL MOTOR LOAD RESPONSIVE SEQUENTIAL STARTING CIRCUIT
Filed June 6, 1961   2 Sheets-Sheet 1

FIG. I

INVENTOR
GORDON E. COBB
Imirie & Smiley
Attys.

INVENTOR
GORDON E. COBB

United States Patent Office 3,205,420
Patented Sept. 7, 1965

3,205,420
PLURAL MOTOR LOAD RESPONSIVE
SEQUENTIAL STARTING CIRCUIT
Gordon E. Cobb, Stamford, England, assignor to Messrs.
Blackstone & Co. Limited, Stamford, England
Filed June 6, 1961, Ser. No. 115,158
11 Claims. (Cl. 318—99)

This invention relates to the control of electric motors and is especially though not essentially concerned with the control of a plurality of motors each driving a pump and supplied with electric power from a remote source, such as a plurality of electrical generators.

An object of the invention is to ensure that the motors start in sequence in a prearranged order in accordance with load demands provided that a motor is started only when there is sufficient power available from the generators.

An object of the invention is to provide for the stopping of motors in a reverse sequence should the generating station become overloaded.

From one aspect, the invention provides a control system for a plurality of motors to be operated in sequence including a current level detector biassed in one direction by a current proportional to the load and in the other direction by a current proportional to the available generating capacity, the detector operating when the former of these biassing currents exceeds the latter to cut off the supply of control current to the starter of a motor next to be brought into operation.

From another aspect, the invention provides a control system for a plurality of electric motors operable in parallel from bus bars to which one or more electric generators may be connected sequentially, comprising a magnetic amplifier forming a current level detector biassed in one direction by a current proportional to the load on the bus bars and in the other direction by a current proportional to the total generating capacity of the generators delivering to the bus bars, and a control line from the magnetic amplifier through which current to operate the starting contactors of the motors is supplied, the supply to this control line being cut off when the current through the magnetic amplifier due to the load on the bus bars exceeds that which is proportional to the generating capacity.

From yet another aspect, the invention provides a control system for a plurality of motors to be operated in sequence comprising a starter for starting each motor, a control line supplying current to the starter first in the sequence, and means operated by the closing of each contactor for transferring the control line to the starter next in the sequence. Such means may comprise an auxiliary contactor operation of which closes contacts by which the control line is connected to the succeeding starter.

Each motor may be started in succession by closure of a switch operated by an increasing load, for example by a float switch operated by a rising water level. The supply to the control line may be cut off to prevent starting of an additional motor should the connected generating capacity be insufficient.

Means may also be provided for tripping the motors in the reverse sequence should the load exceed the connected generating capacity. Such means may comprise a tripping control sequence line from the current level detector to the last starter and change-over contacts in the successive starters normally connecting the tripping control sequence line to the starters in succession, these change-over contacts changing as each starter is operated to set a trip coil in condition to be energised the current level detectors being set to operate at a predetermined overload on the bus bars to supply current through the tripping control sequence line to the trip coil in the starter of the last operating motor in the sequence.

In order that the sequence of operation of the motors may be changed, a plurality of sequence control positions may be provided to any of which the starter of any individual motor may be connected, for example by plug and socket connections.

Figure 2:
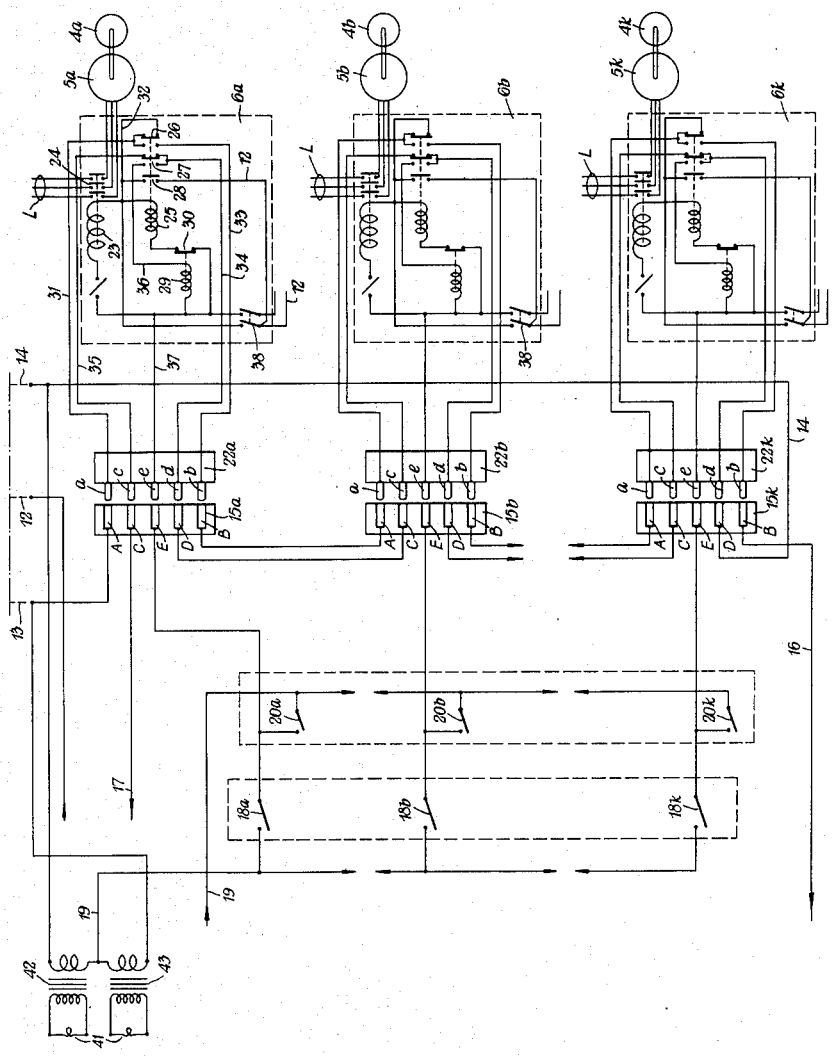

Other parts of the invention are embodied in the preferred form which will now be described in some detail by way of example with reference to the accompanying drawings, wherein FIG. 1 is a schematic circuit diagram of the generator, or power circuits; and FIG. 2 is a schematic circuit diagram of the motor, or load circuits of the system.

A particular application of the invention is to the control of sewage pumps when the pumping station is remote from the power source and the preferred form will be described in relation to such an application.

The power source comprises a number of diesel engine generator sets 1a, 1b, 1c . . . (five being shown) each of which can be connected to station bus bars 2 by a breaker 3a, 3b, . . . . The pumping station, which is remote from the power source, contains say eleven pumping units 4a, . . . direct coupled to squirrel cage inductor motors 5a, . . . each having a starting current of not more than 4½ times normal full load current and a run up time of ten to fifteen seconds. The motors are started by switching them direct-on-line by means of starting contactors 6a, 6b, . . . and are supplied with current though lines L from the station bus bars 2 preferably through transformers and a high voltage transmission line.

A current transformer 7 is arranged on one of the station bus bars 2 and supplies a current, proportional to the load on the bus bar, to a magnetic amplifier 8 biassing it in one direction. An additional current biassing the magnetic amplifier 8 in the opposite direction is supplied from a source 9 through a number of resistances 10a, 10b, . . . in series. Each resistance is associated with one of the generators 1a, 1b, . . . and is in parallel with a switch 11a, 11b . . . which is closed when the breaker 3a, 3b, . . . connecting that generator to the bus bars is closed. As each breaker is closed, the additional biassing current to the magnetic amplifier is increased so that the additional biassing current at any time is proportional to the generating capacity connected to the bus bars. The resultant of these two biassing currents forms the controlling bias for the magnetic amplifier 8.

Three control cables 12, 13, 14 are taken from the magnetic amplifier 8 to the pump house and these may be of any desired length. One cable 12 forms the input to the control systems (hereinafter for convenience referred to as the red phase), one 13 is the starting sequence control line and the third is the tripping sequence control line 14.

At the pump house are provided eleven sequence sockets 15a, 15b, . . . each comprising five female connectors A, B, C, D, and E. Connector A of the first socket 15a is connected to the starting sequence control line 13, connector A of the second socket 15b is connected to connector B of the first socket and so on, connector B of the last socket 15k being connected to a starting sequence control return line 16.

Connector D of the last socket 15k is connected to the tripping sequence control line 14, connector C of the last socket 15k is connected to connector D of the preceding socket and so on, connector C of the first socket 15a being connected to a tripping sequence control return line 17.

The connector E of each socket is connected to a float switch 18a, 18b . . . and thence to another phase 19 of the control supply (hereinafter referred to as the blue phase). The float switches 18a, 18b . . . are arranged to close sequentially as the water level being controlled rises, that connected to the first socket 15a closing first. A test switch 20a, 20b is connected in parallel with each float switch 18a, 18b . . . .

A starter 6a, 6b, . . . is provided for each of the eleven motors and any starter may be connected to any one of the sequence sockets 15a, 15b . . . by a plug 22a, 22b, . . . having five pins designated a, b, c, d, e, arranged so that pin a engages connector A, b engages connector B and so on. In this way the actual order in which the motors start can be varied by connecting them appropriately to the sequence sockets.

Each starter 6a, 6b, . . . includes a main operating coil 23, energisation of which closes main contacts 24 connecting the motor 5a, 5b, . . . direct on to the line L. An auxiliary coil 25 is connected in parallel with the main coil 23 and when energised operates a series of contacts forming respectively a starting sequence changeover switch 26, a tripping sequence change-over switch 27 and a normally open latching contact 28. The changeover switches 26, 27 are arranged to be time delayed for an adjustable period of approximately 5 seconds and the latching contact 28 is always made first and broken last.

Each starter 6a, 6b, . . . is provided with a trip coil 29 energisation of which opens a normally closed contact 30 in the circuit of the auxiliary coil 25.

The common point of the starting sequence change-over switch 26 is connected by a line 31 to a pin a of the plug. The normally closed contact of this switch is connected by conductor 32 to one end of the main coil 23 and to one end of the auxiliary coil 25 and the normally open contact of this switch is connected by line 33 to pin b of the plug.

The common point of the tripping sequence change-over switch 27 is connected by line 34 to pin d of the plug, the normally closed contact is connected by line 35 to pin c of the plug and the normally open contact of the switch 27 is connected by conductor 36 to one end of the trip coil 29.

The other ends of the main coil 23 auxiliary coil 25 and trip coil 29 are connected by line 37 to pin e of the plug.

The latching contact 28 is in a circuit from the first end of the main coil 23 to the red control phase 12.

The operation of the system is as follows: Assuming that no pumps are in operation and No. 1 float switch 18a is closed, current will flow from the blue phase 19 through the float switch 18a to connector E of the first sequence socket, 15a through pin e to the main coil 23 and auxiliary coil 25 of the associated starter 6a in parallel, through line 32 to the normally closed contact of the starting sequence change-over switch 26, back through line 31 to pin a and connector A of the socket, thence through the starting sequence control line 13 to the magnetic amplifier 8 and thence to the red phase 12. The auxiliary coil 25 being thus energised, its latching contact 28 is closed connecting the main auxiliary coils 23, 25 to the red phase 12 direct. A short time after, the two change-over switches 26 and 27 change over, the starting sequence change-over switch 26 isolating the starting sequence control line 13 from starter (6a) and transferring the control to starter 6b through sequence socket 15b, and the tripping sequence change-over switch selecting the tripping circuit.

The main contactor coil 23 will also be energised through the latching contact 28 and so, before the change-over switches operate, the main contactor 24 will have closed the motor 5a to the supply bus bars 2. The starting current will be reflected in the current transformer 7 increasing the bias in the magnetic amplifier 8 due to the load and the magnetic amplifier 8 will operate to isolate the starting sequence control line 13 from the red input phase 12 unless the available generator capacity on the bus bars is sufficient to overcome this bias.

Although the control line 13 has been switched to starter 6b this second starter will not operate until the current in the current transformer 7 and so the bias on the magnetic amplifier 8 has fallen to such a level as will allow the reconnection of the sequence control line 13 to the red input phase 12. It is impossible to start a second pump whilst another pump is being started.

The control line will remain isolated until the number of generating sets 1a, 1b, . . . on the bars 2 is increased and the breaker auxiliary switch 11a, 11b, . . . on the incoming plant is opened, thereby altering the reference bias to a new value. The control line 13 will then be established and it will be possible to start the next pump 4b.

This sequence will be repeated for each starter 6b, 6c, . . . in turn under the control of the float level switches, 18a, 18b, . . . or for testing purposes, by the test switches 20a, 20b, in parallel with the float switches.

It will be apparent that complete failure of the supply from the power house will not entail an emergency at the pump house as the motors will come into operation in sequence following the load level as each incoming set is synchronised to the bus bars. A hand control switch 38 may however be provided at each starter so that each pump may be started manually even if all the controls including the float switches are inoperative.

Should the station bus bars become overloaded, either because of increased load on the motors or because of insufficient capacity connected to the bus bars, motors will be stopped in sequence commencing with the last motor running and continuing until the overload is removed.

The magnetic amplifier trip circuit is set to operate at say 25% overload on the bus bars 2 to connect the red phase 12 to the tripping sequence control line 14. Assuming motor 5k is running, a circuit is then established from the red phase 12 through the tripping sequence control line 14 to connector D of sequence socket 15k, pin d to the common point of tripping sequence change-over switch 27 in starter 6k, to normally open contact of this switch (now closed because the motor is running), through trip coil 29 and back to the blue phase 17 via pin c and connector E of the socket 15k. The trip coil 29 is energised and opens the normally closed contacts 30 in the circuit of the auxiliary coil, 25 de-energising both the auxiliary coil 25 and the main coil 23. The motor 5k is thus disconnected from the bus bars by opening of the main contactor 24 and the tripping control line 14 is transferred to the socket 15j through the normally made contacts of the tripping sequence change-over switch 27. As the auxiliary contactor resets, it will reselect the start control line 13 but as the load level is well above the starting control level the starting control line 13 will be isolated by the magnetic amplifier 8 and the motor will not attempt to restart.

The tripping sequence will continue from 15k towards socket 15a until the bus bar current is low enough to switch off the tripping circuit.

Normal operating stability of the system is ensured by the differential level of the float controller and a time lag is built into the amplifier circuit so that the starting control line is connected to the red control phase a short time after the operation of any breaker auxiliary switch, thus allowing an incoming set to stabilise before the pump starting load is connected to the bus bars.

The delayed operation of the change-over contacts mentioned above ensures the stable operation of the starting sequence.

The difference in current level at which the control sequence switches off and the tripping sequence switches on ensures stability of operation of the tripping circuit.

Warning circuits 40, 41 are provided at the power station and at the pump house to indicate the condition of the starting sequence and tripping sequence respectively. These circuits are supplied from transformers 42, 43 connected between the blue phase 19 and the starting sequence control line 13 and between the blue phase and the tripping sequence control line 14 respectively. The starting sequence warning may comprise a green "Power available" lamp and a red "Power required" lamp with an audible alarm operative on the "power required" signal. The tripping warning may comprise a red lamp associated with an audible alarm such as a hooter.

The test switches in parallel with the float switches may conveniently be mounted in line adjacent the sequence sockets. They should be of a kind which will indicate mechanically as well as visually that they have been operated.

It will be understood that the invention is not restricted to the details of the preferred form described by way of example which may be modified without departure from the broad ideas underlying them.

I claim:
1. A control system for starting and operating electric motors in parallel, comprising a set of bus bars, a plurality of electric generators connectable sequentially to power said bus bars, a plurality of motors, a starter associated with each motor for connecting said motors across said bus bars, a magnetic amplifier forming a current level detector biased in one direction by a current proportional to the load on the bus bars and in the other direction by a current proportional to the total generating capacity of the generators delivering to the bus bars, and a control line from the magnetic amplifier to the starters through which current to operate the starters is supplied, the supply to said control line being cut off when the current through the magnetic amplifier due to the load on the bus bars exceeds that which is proportional to the generating capacity.

2. A control system according to claim 1 in which transfer means is provided operable on the starting of each motor in the sequence to transfer the control line to the starter of the next motor in sequence.

3. A control system according to claim 2 in which said starters each include a main contactor and said transfer means includes an auxiliary contactor associated with each motor and operated by the starting of the preceding motor to transfer said control line to the motor next in sequence to be started.

4. A control system as claimed in claim 1 wherein for each starter is included a switch operated by an increasing load whereby each motor is started in succession by operation of said switch upon receipt by the associated starter of current through said control line of the current level detector.

5. A control system as claimed in claim 1 wherein is provided a plurality of connectors whose circuit position and connections determine sequence control and to any of which connectors the starter of any individual motor may be connected.

6. A control system according to claim 1 including means for tripping the motors in reverse sequence when the load exceeds the connected generating capacity.

7. A control system according to claim 6 in which said sequence tripping means comprises a tripping control sequence line from the current level detector connected to the last starter and means for transferring the tripping control line to the preceding starter in succession as each motor is tripped.

8. A control system according to claim 7 in which the means for transferring the tripping control includes an auxiliary contactor associated with each motor and operated by the opening of the starter of the succeeding motor.

9. A control system according to claim 8 wherein said means for transferring the tripping control line includes change-over contacts associated with each of the starters and normally connect the tripping control sequence line to the starters in succession, a trip coil associated with each starter, said changeover contacts changing as each starter is operated to set a trip coil for the starter in condition to be energised, the current level detector being set to operate at a predetermined overload on the bus bars to supply current through the tripping control sequence line to the trip coil in the starter of the last operating motor in the sequence.

10. A control system as claimed in claim 9 wherein said starters each include latching contacts in addition to said auxiliary contactor operating the change-over contacts for transferring the starting and tripping sequence control lines, said latching contacts maintaining energisation of the starter, and said change-over contacts being time delayed so that the latching contact is always made first and broken last.

11. A control system as claimed in claim 1 in combination with a plurality of pumps remote from said source of power, each of said pumps being operated by one of said motors.

References Cited by the Examiner

UNITED STATES PATENTS 1,994,376  3/35  Wilkinson _____ 318—106
2,060,755  11/36 Exner _____ 318—102

FOREIGN PATENTS 552,059  1/58  Canada.

ORIS L. RADER, *Primary Examiner.*

MILTON O. HIRSHFIELD, *Examiner.*